US012190496B2

(12) United States Patent
Kozuka et al.

(10) Patent No.: US 12,190,496 B2
(45) Date of Patent: Jan. 7, 2025

(54) LAST PRODUCTION ASSISTING APPARATUS AND LAST PRODUCTION SYSTEM

(71) Applicant: ASICS CORPORATION, Kobe (JP)

(72) Inventors: Yuya Kozuka, Kobe (JP); Genki Hatano, Kobe (JP); Shingo Takashima, Kobe (JP)

(73) Assignee: ASICS CORPORATION, Kobe (JP)

( * ) Notice: Subject to any disclaimer, the term of this patent is extended or adjusted under 35 U.S.C. 154(b) by 510 days.

(21) Appl. No.: 17/548,276

(22) Filed: Dec. 10, 2021

(65) Prior Publication Data

US 2022/0207715 A1 Jun. 30, 2022

(30) Foreign Application Priority Data

Dec. 24, 2020 (JP) ................................. 2020-214961

(51) Int. Cl.
*G06T 7/00* (2017.01)
*G05B 19/418* (2006.01)

(52) U.S. Cl.
CPC ...... *G06T 7/0008* (2013.01); *G05B 19/41805* (2013.01); *G06T 7/001* (2013.01)

(58) Field of Classification Search
CPC . G06T 7/0008; G06T 7/001; G05B 19/41805; B33Y 80/00; A43D 2200/60; A43D 3/02; A43D 1/025; G06F 30/20
See application file for complete search history.

(56) References Cited

U.S. PATENT DOCUMENTS

| 4,817,222 A | * | 4/1989 | Shafir | ...................... A43D 1/04 |
| | | | | 12/146 L |
| 4,884,309 A | * | 12/1989 | Shafir | ................ G05B 19/4207 |
| | | | | 12/146 L |
| 10,463,113 B2 | * | 11/2019 | Manz | ................. A43D 111/003 |
| 2004/0168329 A1 | | 9/2004 | Ishimaru | |
| 2006/0034548 A1 | * | 2/2006 | Pishdadian | ............ G01B 11/24 |
| | | | | 382/312 |
| 2013/0125319 A1 | * | 5/2013 | Regan | .................... A43D 63/00 |
| | | | | 700/114 |

(Continued)

FOREIGN PATENT DOCUMENTS

EP        3 578 348 A1    12/2019
JP        2001-204512 A    7/2001

(Continued)

OTHER PUBLICATIONS

The extended European search report issued by the European Patent Office on May 9, 2022, which corresponds to European Patent Application No. 21213781.4-1015 and is related to U.S. Appl. No. 17/548,276.

*Primary Examiner* — Roy M Punnoose
(74) *Attorney, Agent, or Firm* — Studebaker & Brackett PC

(57) ABSTRACT

A last production assisting apparatus comprises a camera, a storage, a processor, and a display. The camera images a plurality of parts constituting a last. The storage stores production information for producing the last. Based on the production information, the processor calculates attachment positions or the like for the plurality of parts imaged by the camera. The display displays the attachment positions calculated by the processor for the plurality of parts.

20 Claims, 13 Drawing Sheets

(56) References Cited

U.S. PATENT DOCUMENTS

| | | | | |
|---|---|---|---|---|
| 2014/0081441 A1* | 3/2014 | Regan | ............... | G05B 19/4097 |
| | | | | 700/98 |
| 2016/0166011 A1 | 6/2016 | Bruce et al. | | |
| 2016/0219266 A1* | 7/2016 | Lane | ..................... | A43D 1/04 |
| 2017/0188664 A1* | 7/2017 | Manz | ..................... | A43D 8/02 |
| 2017/0249783 A1* | 8/2017 | Mach Shepherd | ..... | G06T 17/20 |
| 2022/0114289 A1* | 4/2022 | Te | ......................... | G06N 3/045 |

FOREIGN PATENT DOCUMENTS

| | | | |
|---|---|---|---|
| JP | 6685303 B2 | 4/2020 | |
| WO | 2016/093955 A1 | 6/2016 | |

\* cited by examiner

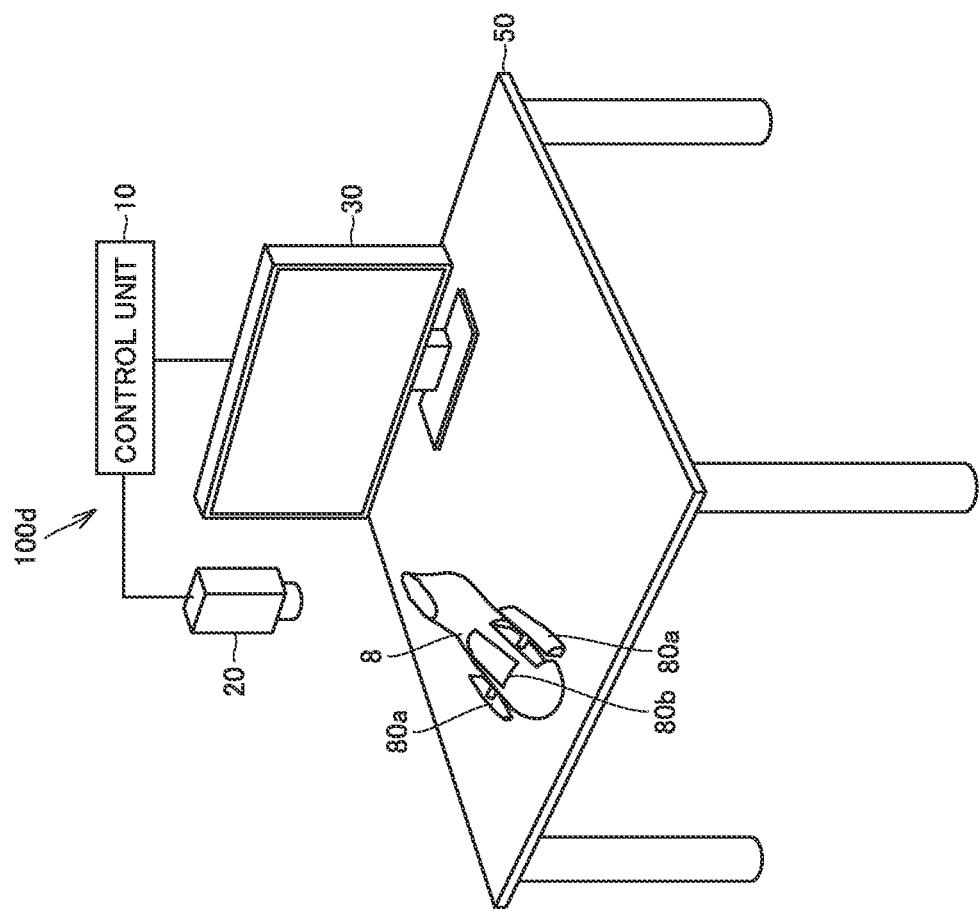
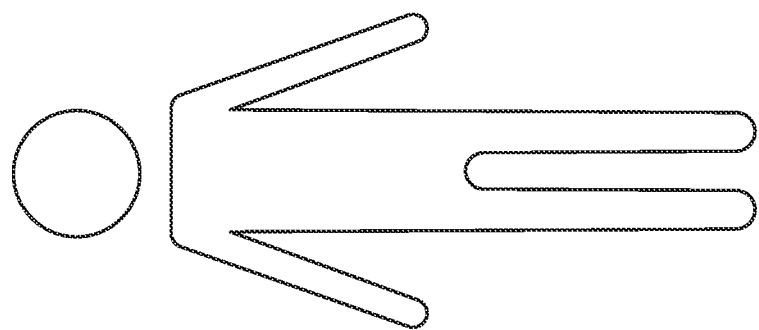
FIG.12

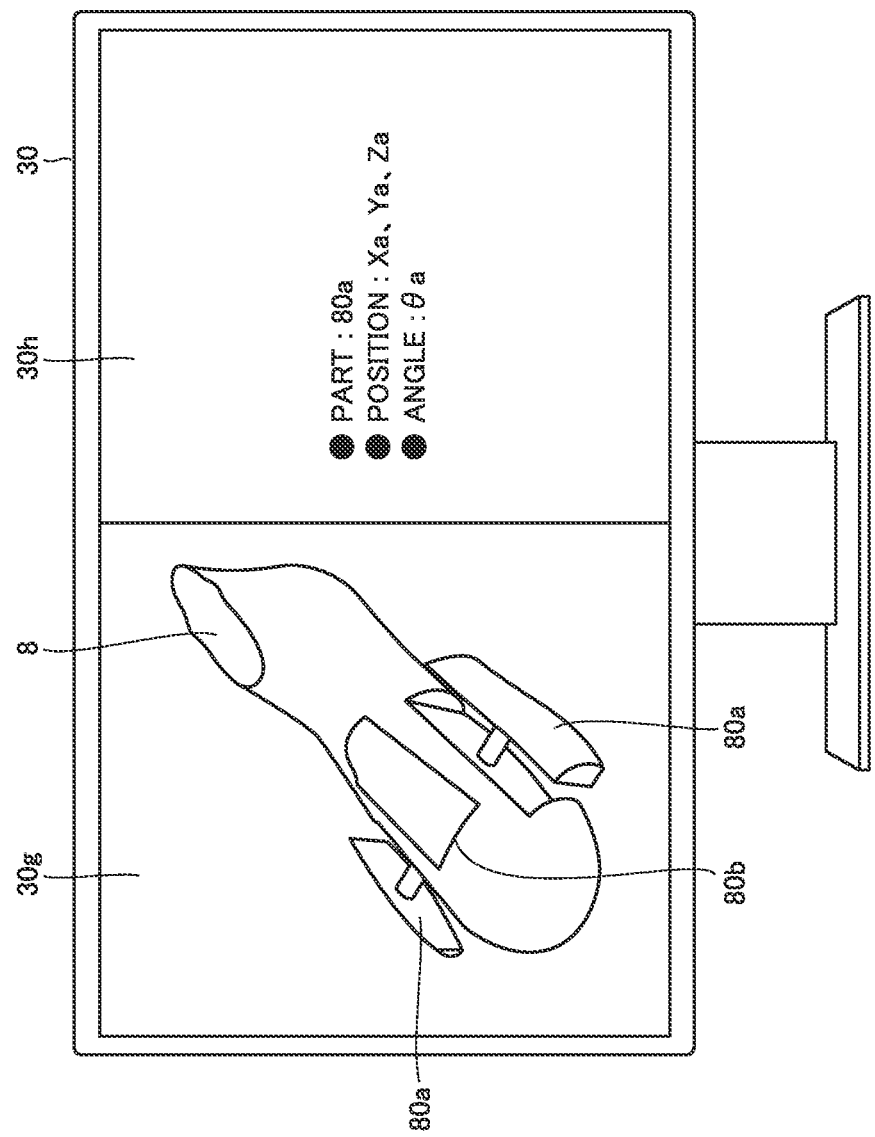

LAST PRODUCTION ASSISTING APPARATUS AND LAST PRODUCTION SYSTEM

This nonprovisional application is based on Japanese Patent Application No. 2020-214961 filed on Dec. 24, 2020 with the Japan Patent Office, the entire contents of which are hereby incorporated by reference.

BACKGROUND OF THE INVENTION

Field of the Invention

The present disclosure relates to a last production assisting apparatus and a last production system.

Description of the Background Art

When a made-to-order shoe tailored to a foot of a user is produced, it is necessary to produce a last tailored to a foot shape measured with a measuring instrument. In order to produce a customized last, the last is produced using an apparatus such as a three-dimensional printer (For example, see Japanese Patent No. 6685303).

SUMMARY OF THE INVENTION

Producing a last when producing a made-to-order shoe is, however, not necessarily limited to doing so using an apparatus such as a three-dimensional printer. In particular, when a last is produced in a store or the like, the store may not have an apparatus such as a three-dimensional printer, and a plurality of parts are assembled or adjusted or a standard last (or an object) is processed to produce a last.

In a store or the like, when a plurality of parts are assembled or adjusted or a standard last (or an object) is processed to produce a last, a store clerk will assemble or adjust or process the last. However, if the store clerk is not skilled in the work, it takes time because the store clerk produces the last by trial and error, or there is a possibility that a problem occurs in that the last cannot be produced with high accuracy.

The present disclosure provides a last production assisting apparatus and last production system that assists producing a last when the last is produced by assembling or adjusting a plurality of parts or processing an object.

According to an aspect of the present disclosure, there is provided a last production assisting apparatus that is used when producing a last by assembling or adjusting a plurality of parts or processing an object. The last production assisting apparatus comprises a camera, a storage, a processor, and a display. The camera images a plurality of parts constituting the last, or the object. The storage stores production information for producing the last. The processor calculates based on the production information positions at which the plurality of parts imaged by the camera are attached or an amount in which the plurality of parts imaged by the camera are adjusted, or a region of the object to be processed and an amount in which the object is processed. The display displays the positions at which the plurality of parts are attached or the amount in which the plurality of parts are adjusted, or the region of the object to be processed and the amount in which the object is processed, as calculated by the processor.

A last production system according to an aspect of the present disclosure produces a last by assembling or adjusting a plurality of parts or processing an object. The last production system comprises a camera, a storage, a processor, a production apparatus, and a communication controller. The camera images a plurality of parts constituting the last, or the object. The storage stores production information for producing the last. The processor calculates based on the production information positions at which the plurality of parts imaged by the camera are attached or an amount in which the plurality of parts imaged by the camera are adjusted, or a region of the object to be processed and an amount in which the object is processed. The production apparatus assembles or adjusts the plurality of parts or processes the object. The communication controller transmits to the production apparatus the positions at which the plurality of parts are attached or the amount in which the plurality of parts are adjusted, or the region of the object to be processed and the amount in which the object is processed, as calculated by the processor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a schematic diagram showing a configuration example of a last production assisting apparatus according to a fifth embodiment.

FIG. 13 is a diagram showing an example of indication displayed by a display unit of the last production assisting apparatus according to the fifth embodiment.

DESCRIPTION OF THE PREFERRED EMBODIMENTS

Hereinafter, embodiments will be described with reference to drawings. In the following description, identical components are identically denoted. Their names and functions are also identical. Accordingly, such components will not be described repeatedly.

First Embodiment

In a first embodiment, an example of a scene in which the present invention is applied will be described. Initially in the first embodiment will be described a last production assisting apparatus that assists producing a last in a store when a store clerk produces the last based on foot shape data measured with a measurement instrument in producing a made-to-order shoe tailored to a foot of a user by way of example. As a matter of course, a person who produces the last is not limited to a store clerk, and a user per se may produce the last. Further, the last production assisting apparatus is not limited to using it when producing a last for a made-to-order shoe, and may be used in a factory or the like to produce a last for a ready-made shoe.

Figure 1:
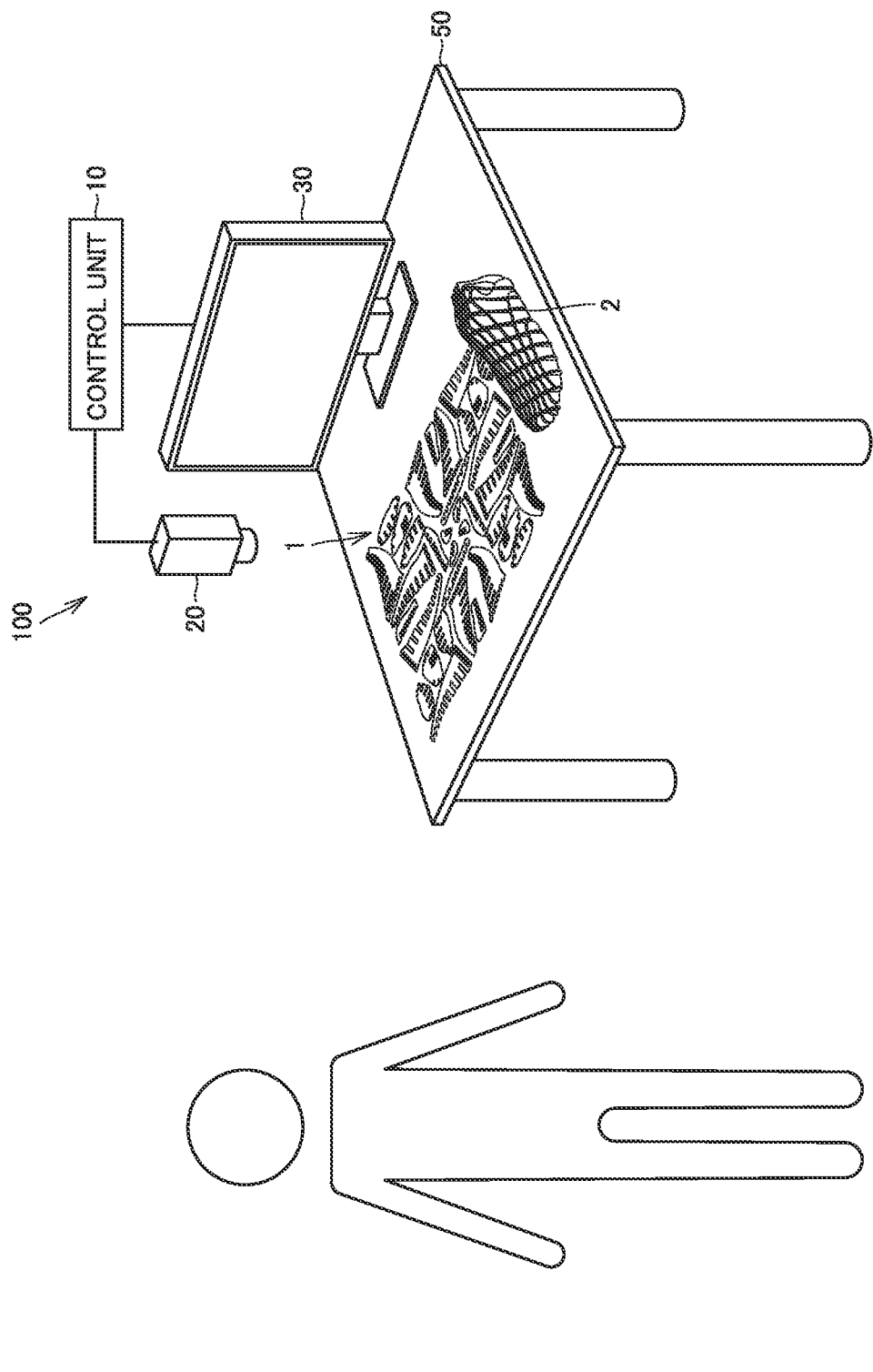
FIG. 1 is a schematic diagram showing a configuration example of a last production assisting apparatus according to a first embodiment.

FIG. 1 is a schematic diagram showing a configuration example of a last production assisting apparatus 100 according to the first embodiment. Referring to FIG. 1, the last production assisting apparatus 100 includes a control unit 10, a camera 20 (an imaging unit), and a display 30 (a display unit). The last production assisting apparatus 100 is provided on a work table 50 on which a last is produced. A plurality of plate-shaped parts 1 that can be assembled to produce the last are placed on the work table 50. In the first embodiment, the plurality of plate-shaped parts 1 are each provided with an engagement groove and attached there to produce the last. A last 2 completed by assembling the plurality of plate-shaped parts 1 is also placed on the work table 50. The plate-shaped part 1 may be formed of material such as highly recyclable cardboard, metal, thermoplastic resin, or the like. The plate-shaped part is not limited in shape, what structure is used to engage it, and the like insofar as the plate-shaped part is a plate-shaped planar part.

In the last production assisting apparatus 100, in order to recognize the shape of each plate-shaped part 1 placed on the work table 50, the camera 20 is used to capture an image of plate-shaped part 1. Accordingly, the camera 20 is fixed in a direction substantially perpendicular to a working surface of the work table 50 so that the camera 20 can capture an image of the plurality of plate-shaped parts 1 placed on the work table 50. The camera 20 may be fixed in any method such as fixing the camera 20 to a stand provided on the work table 50 or fixing the camera 20 to equipment provided on a ceiling. It should be noted that, as the camera 20, an imaging unit having an imaging ability or a space recognition function of an extent capable of capturing an image of the plurality of plate-shaped parts 1, a last being assembled, a hand of an operator (such as a store clerk or a user) and the like, and performing an image analysis, suffices. The imaging unit may for example be a depth camera, an X-ray CT, a three-dimensional optical measurement instrument, or the like, and may be configured to include an optical component such as a lens. The camera 20 is not limited to a single camera, and may be a plurality of cameras.

The last production assisting apparatus 100 causes the display 30 to display assistive information for producing a last from the plurality of plate-shaped parts 1 recognized by the camera 20. Accordingly, the display 30 is placed on the work table 50 so as to be visible to the operator. The display 30 may be installed in any method, and it may be placed on the work table 50 via a stand provided on the display 30 or may be set via equipment provided on a wall. The display 30 is not limited to a display which displays a two-dimensional image, and may be a display which displays a three-dimensional image. Further, rather than the display 30 placed on the work table 50, a virtual reality (VR) goggle that displays a virtual reality, an augmented reality (AR) goggle that displays an augmented reality, or a mixed reality (MR) goggle that displays a virtual reality and an augmented reality may be caused to display assistive information for producing a last. In other words, the display unit such as the display 30, the AR goggle and the like that can display assistive information in any manner visibly to the operator, suffices.

Figure 2:
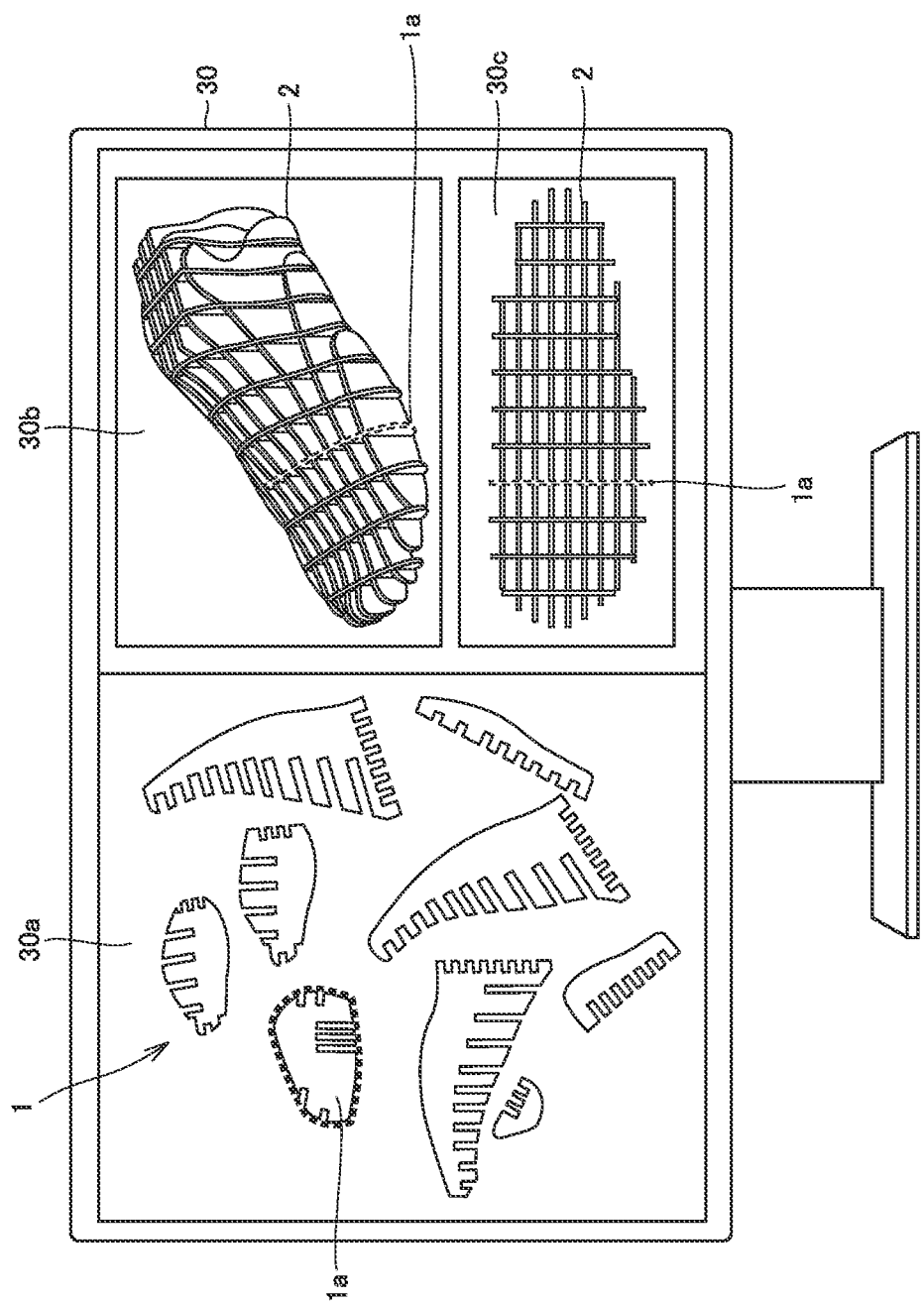
FIG. 2 is a diagram showing an example of indication displayed by a display unit of the last production assisting apparatus according to the first embodiment.

As the assistive information for producing a last from the plurality of plate-shaped parts 1, the display 30 displays information such as an attachment position for a plate-shaped part 1. FIG. 2 is a diagram showing an example of indication displayed by the display unit of last production assisting apparatus 100 according to the first embodiment. The display 30 displays for example, as shown in FIG. 2, a screen 30a of the plurality of plate-shaped parts 1 placed on the work table 50, a screen 30b showing a three-dimensional view of the last 2 that is completed, and a screen 30c showing a bottom view of the completed last 2. In the last production assisting apparatus 100, for example, a plate-shaped part 1a to be next attached is highlighted and displayed on the screen 30a, and furthermore, a position at which the plate-shaped part 1a is attached, as viewed in the completed last 2, is highlighted and displayed. Specifically, the screen 30b shows the completed last 2 in a three-dimensional view such that the plate-shaped part 1a to be next attached is displayed in a color or by a type of line different than the other plate-shaped parts 1 or blinked and thus displayed. The screen 30c shows the completed last 2 in a bottom view such that the plate-shaped part 1a to be next attached is displayed in a color or by a type of line different than the other plate-shaped parts 1 or blinked and thus displayed. While the display 30 has been described by way of example as a screen such as a monitor used to provide an operator with assistive information such as an attachment position for a plate-shaped part 1, a screen such as a monitor may not be used and a device may be used to provide the assistive information to the operator. For example, it may be a device which provides the assistive information by exposing an identified plate-shaped part 1 to a laser beam or the like, or may be a device which provides the assistive information by directly projecting information on the work table 50 or in a working space.

In the last production assisting apparatus 100, the control unit 10 processes the assistive information for producing a last from a plurality of plate-shaped parts 1 recognized by the camera 20. The control unit 10 may have a configuration in which a program which assists producing a last is incorporated in a general-purpose computer, or may be a dedicated hardware configuration (e.g., ASIC or FPGA) having incorporated therein a program which assists producing a last. The control unit 10 may be placed on the work table 50, in a vicinity of the work table 50, or inside or outside a store.

Figure 3:
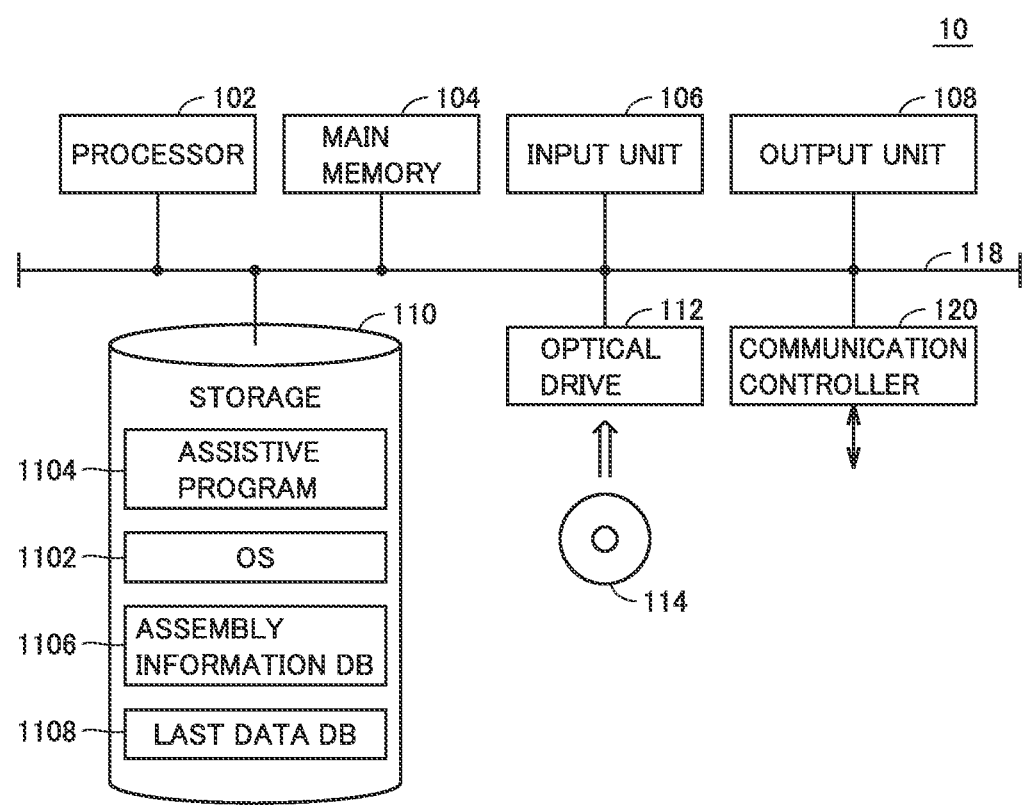
FIG. 3 is a schematic diagram showing an example of a hardware configuration of a control unit of the last production assisting apparatus according to the first embodiment.

Hereinafter, the control unit 10 will be described as a general-purpose computer with a program incorporated therein to assist producing a last. FIG. 3 is a schematic diagram showing an example of a hardware configuration of the control unit 10 of the last production assisting apparatus 100 according to the first embodiment. Referring to FIG. 3, the control unit 10 includes a processor 102, a main memory 104, an input unit 106, an output unit 108, a storage 110, an optical drive 112, and a communication controller 120. These components are connected via a processor bus 118.

The processor 102 is composed of a CPU, a GPU, or the like, and can read a program (an OS 1102 and an assistive program 1104 by way of example) stored in the storage 110, and can develop the read program in the main memory 104 and execute the program. The processor 102 executes the assistive program 1104 to calculate information, as based on a predetermined algorithm, from information received from the camera 20 by the input unit 106 to assist producing a last. That is, the processor 102 is a calculation unit that calculates, based on production information for producing a last, attachment positions for the plurality of plate-shaped parts 1 imaged by the camera 20.

The main memory 104 is composed of a volatile storage device such as a DRAM or an SRAM. The storage 110 is composed for example of a non-volatile storage device such as an HDD or an SSD.

The storage 110 stores the OS 1102 for implementing a basic function, and in addition thereto, the assistive program 1104 for providing a function serving as the last production assisting apparatus 100. Further, the storage 110 stores an assembly information database 1106 including information for assembling a plurality of parts, as predetermined, and a last database 1108 including information for a completed last. The assembly information database 1106 and the last database 1108 are an example of production information for producing a last.

The assembly information database 1106 for example includes information such as a shape of each of the plurality of parts, an order of assembling the plurality of parts, a shape obtained after the plurality of parts are assembled, a type and number of parts required for assembly, a part number, and the like. The last database 1108 for example includes information such as a shape of a completed last (e.g., three-dimensional data, a two-dimensional contour, a three-dimensional position of a feature point, etc.), a dimension of the completed last, an existing last number, and the like. The assembly information database 1106 and the last database 1108 are not limited to being stored in the storage 110, and may be stored in an external data server connected to the control unit 10. The storage 110 or the external data server is a storage unit that stores production information for producing a last.

The input unit 106 includes an input interface connected to the camera 20 and receiving information captured by the camera 20. The input unit 106 can be connected to a keyboard, a mouse, a microphone, a touch device, and/or the like, and further receive information input by the operator.

The output unit 108 includes an output interface to externally output the information calculated by the processor 102 to assist producing a last. The output unit 108 is also connected to the display 30, a speaker AR goggle, a tactile device, a variety of indicators, a printer, and the like and outputs a processing result or the like received from the processor 102.

The communication controller 120 communicates data with a production apparatus or the like through wired communication or wireless communication. The control unit 10 may communicate information with the production apparatus via the communication controller 120 to assist producing a last. A USB controller connected to the processor bus 118 may be provided separately from the communication controller 120 to communicate information with the production apparatus or the like via USB connection.

The control unit 10 has optical drive 112, and from a recording medium 114 (e.g., an optical recording medium such as a digital versatile disc (DVD)) that stores a computer-readable program in a non-transitory manner), a program stored therein may be read and installed in the storage 110 or the like.

While the assistive program 1104 or the like executed by the control unit 10 may be installed via the computer-readable recording medium 114, it may be downloaded from a server device on a network or the like and installed. A function provided by the control unit 10 according to the first embodiment may also be implemented by using a part of a module provided by the OS.

Figure 4A:
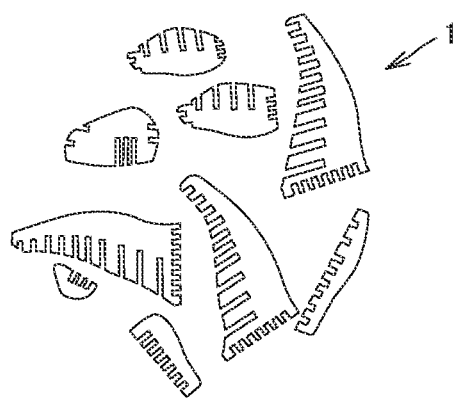
FIG. 4A is a schematic diagram for illustrating recognition of a plate-shaped part.
Figure 4B:
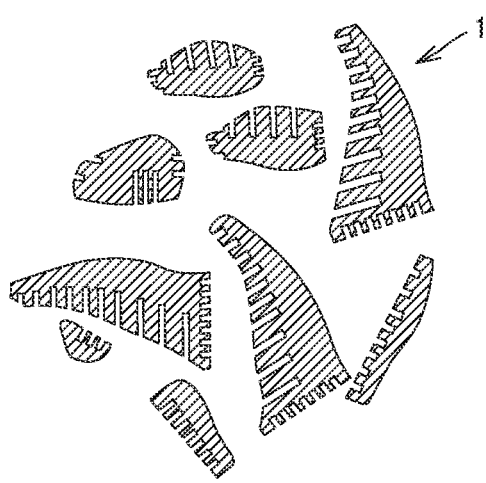
FIG. 4B is a schematic diagram for illustrating recognition of a plate-shaped part.
Figure 4C:
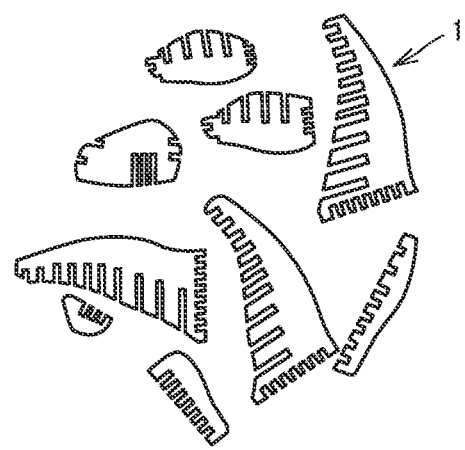
FIG. 4C is a schematic diagram for illustrating recognition of a plate-shaped part.
Figure 5:
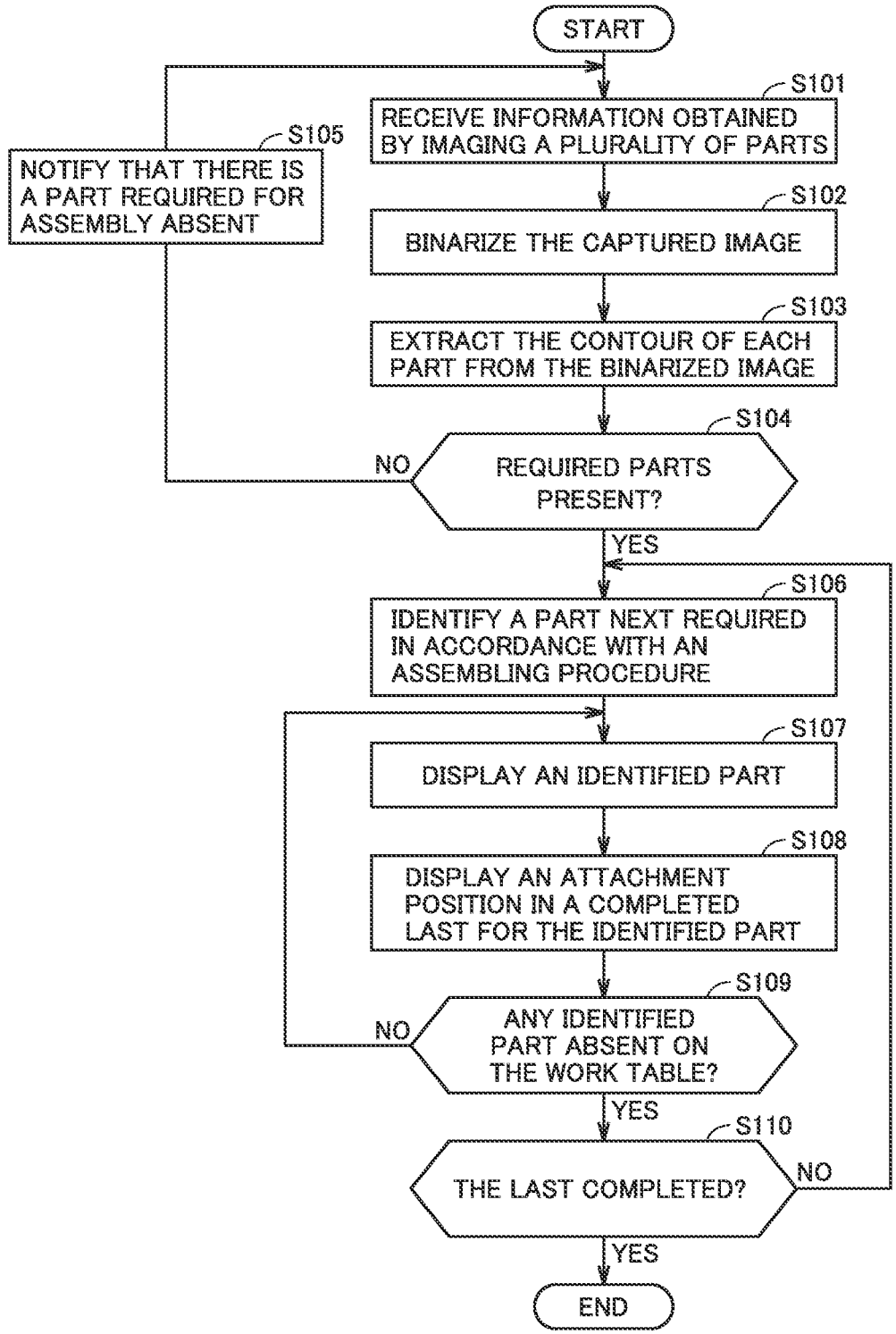
FIG. 5 is a flowchart for illustrating production assistance in the last production assisting apparatus according to the first embodiment.

Hereinafter will be described an example of assisting a procedure through which the control unit 10 recognizes the shape of each of the plate-shaped parts 1 imaged by the camera 20 and assembles the plate-shaped parts 1. FIGS. 4A to 4C are schematic diagrams for illustrating recognition of a plate-shaped part. FIG. 5 is a flowchart for illustrating production assistance in last production assisting apparatus 100 according to the first embodiment. Initially, the control unit 10 receives information obtained by imaging a plurality of plate-shaped parts 1 on the work table 50 (step S101). The image shown in FIG. 4A is an image of the plurality of plate-shaped parts 1 imaged by the camera 20. The information obtained by imaging through the camera 20 may be information of a still image or information of motion video.

The control unit 10 performs a process for binarizing the image of the plurality of plate-shaped parts 1 captured by the camera 20 (step S102). The image shown in FIG. 4B is a binarized image of the plurality of plate-shaped parts 1. Binarizing the image of the plurality of plate-shaped parts 1 makes clear a boundary between a portion corresponding to the plate-shaped parts 1 and the remaining portion.

The control unit 10 extracts the contour of each of the plate-shaped parts 1 from the binarized image (step S103). The image shown in FIG. 4C is an image obtained by extracting the contour of each of the plate-shaped parts 1. The control unit 10 extracts the contour of each of the plate-shaped parts 1 and recognizes the shape of each of the plate-shaped parts 1, and the control unit 10 can thus determine the positions on the work table 50 of the plate-shaped parts 1 necessary for producing the last.

The control unit 10 determines whether the plurality of plate-shaped parts 1 on the work table 50 have types of plate-shaped parts 1 and a number thereof that are required for assembly (step S104). The control unit 10 can read types of plate-shaped parts 1 and a number thereof that are required for assembly from the assembly information database 1106, and compare them with each of the plurality of plate-shaped parts 1 on the work table 50 to determine whether the plate-shaped parts 1 required for assembly are present. If not (NO in step S104), the control unit 10 notifies accordingly (step S105), and then returns to step S101. As a specific example of notification, the control unit 10 causes display 30 to display a type and number of plate-shaped parts 1 absent on the work table 50, and urges the operator to prepare the necessary plate-shaped parts 1.

When it is determined that the plate-shaped parts 1 required for assembly are present (YES in step S104), the control unit 10 identifies a plate-shaped part 1 next required in accordance with an order of assembling a plurality of plate-shaped parts 1, as stored in the assembly information database 1106 (step S106). The control unit 10 causes display 30 to display the plate-shaped part 1 identified in step S106 (step S107). Further, the control unit 10 causes display 30 to display an attachment position in the completed last for the plate-shaped part 1 identified in step S106 (step S108). In the example of the screen shown in FIG. 2, the screen 30*a* displays an identified plate-shaped part 1*a* distinguished from other plate-shaped parts 1, and the screen 30*b* and the screen 30*c* display an attachment position in a completed last for the identified plate-shaped parts 1*a*.

When the identified plate-shaped part 1*a* is assembled at the attachment position in the last, the identified plate-shaped part 1*a* disappears from the plurality of plate-shaped parts 1 on the work table 50. Accordingly, the control unit 10 can determine whether the last assembling process has progressed by confirming whether the identified plate-shaped part 1*a* is present in an image captured by the camera 20. Accordingly, the control unit 10 determines whether the identified plate-shaped part 1*a* is absent in the plurality of plate-shaped parts 1 present on the work table 50 as imaged by the camera 20 (step S109). The control unit 10 in step S109 also subjects an image captured by the camera 20 to the binarization performed in step S102 and the contour extraction performed in step S103. The control unit 10 may determine, from an image captured by the camera 20 of the last being assembled, that the identified plate-shaped part 1*a* has been attached to the last. Further, the control unit 10 may determine, from an image captured by the camera 20 of the last being assembled, whether the identified plate-shaped part 1*a* has been attached to the correct position, and if not, the control unit 10 may cause the display 30, a speaker or the like to issue a warning.

When the identified plate-shaped part 1*a* is present on the work table 50 (NO in step S109), the control unit 10 returns to step S107. That is, the control unit 10 determines that the last assembling process has not progressed, and continues to display the identified plate-shaped part 1*a*. On the other hand, when the identified plate-shaped part 1*a* is absent on the work table 50 (YES in step S109), the control unit 10 determines whether the last has been completed (step S110). Specifically, the control unit 10 determines whether the last has been completed from whether no plate-shaped part 1 is present on the work table 50 imaged by the camera 20. That is, when there is no plate-shaped part 1 present on the work table 50 imaged by the camera 20, the control unit 10 determines that the plurality of plate-shaped parts 1*a* are all attached to the last and the last is completed. The control unit 10 may determine that the last has been completed from an image captured by the camera 20 of the last being assembled.

When the last is completed (YES in step S110), the control unit 10 ends the process. On the other hand, when the last is not completed (NO in step S110), the control unit 10 returns to step S106 and identifies a next required plate-shaped part 1 in accordance with the order of assembling the plurality of plate-shaped parts 1.

In the flowchart shown in FIG. 5, when a plurality of parts are assembled to produce a last, the control unit 10 (or the processor 102) sequentially identifies from a plurality of imaged parts a part to be attached to the last in accordance with an assembling procedure, calculates an attachment position for the identified part, and causes the display 30 to display it to assist the assembling procedure, by way of example. However, the method of assisting the assembling procedure is not limited thereto. For example, the control unit 10 (or the processor 102) may identify from a captured image a part held by an operator, calculate an attachment position for the part, and causes display 30 to display it to assist the assembling procedure. A speaker may further be provided in place of or in addition to the display 30. The speaker may audibly output assistive information such as attachment positions calculated by the control unit 10 (or the processor 102) for a plurality of parts. In particular, when a part held by an operator is identified from a captured image, simply assisting an attachment position for the part audibly can assist the assembling procedure without causing display 30 to display the attachment position.

A tactile device may tactilely output assistive information such as attachment positions calculated by the control unit 10 (or the processor 102) for a plurality of parts. For example, when a part held by an operator comes to a predetermined attachment position, the tactile device may output tactile information such as applying vibration to the operator's hand holding the part.

As described above, the last production assisting apparatus 100 according to the first embodiment is a production assisting apparatus for use when a plurality of parts are assembled to produce a last. The last production assisting apparatus 100 comprises the camera 20, the storage 110, the processor 102, and the display 30. The camera 20 images a plurality of parts constituting a last. The storage 110 stores production information for producing the last. The processor 102 calculates attachment positions or the like, based on the production information, for a plurality of parts imaged by the camera 20. The display 30 displays the attachment positions calculated by the processor 102 for the plurality of parts.

Thus, the last production assisting apparatus 100 according to the first embodiment can appropriately assist information required for producing a last when a plurality of parts are assembled to produce the last. An operator using the last production assisting apparatus 100 can produce a last with high accuracy in a short period of time while reducing production errors.

A speaker which audibly outputs the attachment positions calculated by the processor 102 for the plurality of parts or the like may be provided in place of or in addition to the display 30. Thus, the last production assisting apparatus 100 can appropriately, audibly assist information required for producing a last.

A tactile device which outputs as tactile information the attachment positions calculated by the processor 102 for the plurality of parts or the like may be provided in place of or in addition to the display 30. Thus, the last production assisting apparatus 100 can use the tactile information to appropriately assist information required for producing a last.

An AR goggle, a VR goggle, or the like may be used for the display unit to display information such as attachment positions or the like calculated by the processor 102 for a plurality of parts as information of at least one of virtual reality and augmented reality. Thus, the last production assisting apparatus 100 can use information of at least one of virtual reality and augmented reality to appropriately assist information required for producing a last.

The display 30 may display attachment positions for a plurality of parts and a completed last on a single screen. The last production assisting apparatus 100 thus helps an operator to understand the attachment positions for the plurality of parts in the completed last.

When a plurality of parts are assembled to produce a last, the processor 102 may sequentially identify from a plurality of imaged parts a part to be attached to the last in accordance with an assembling procedure, calculate an attachment position for the identified part, and cause the display 30 to display it. Thus, the last production assisting apparatus 100 can follow an order of attaching parts to appropriately assist information required for producing the last.

When a plurality of parts are assembled to produce a last, the processor 102 may identify a part held by an operator, calculate an attachment position for the part, and causes the display 30 to display the calculated attachment position. Thus, the last production assisting apparatus 100 can cause display 30 to display the attachment position for the part held by the operator to appropriately assist the information required for producing the last.

Second Embodiment

In the first embodiment, an example of the last production assisting apparatus 100 that assists producing a last when an operator assembles a plurality of parts to produce the last has been described. In a second embodiment will be described a last production system in which a production apparatus assembles a plurality of parts to produce a last. The last production system according to the second embodiment comprises the configuration of the last production assisting apparatus 100 according to the first embodiment, and the same configuration as the last production assisting apparatus 100 is identically denoted and will not be specifically described repeatedly.

Figure 6:
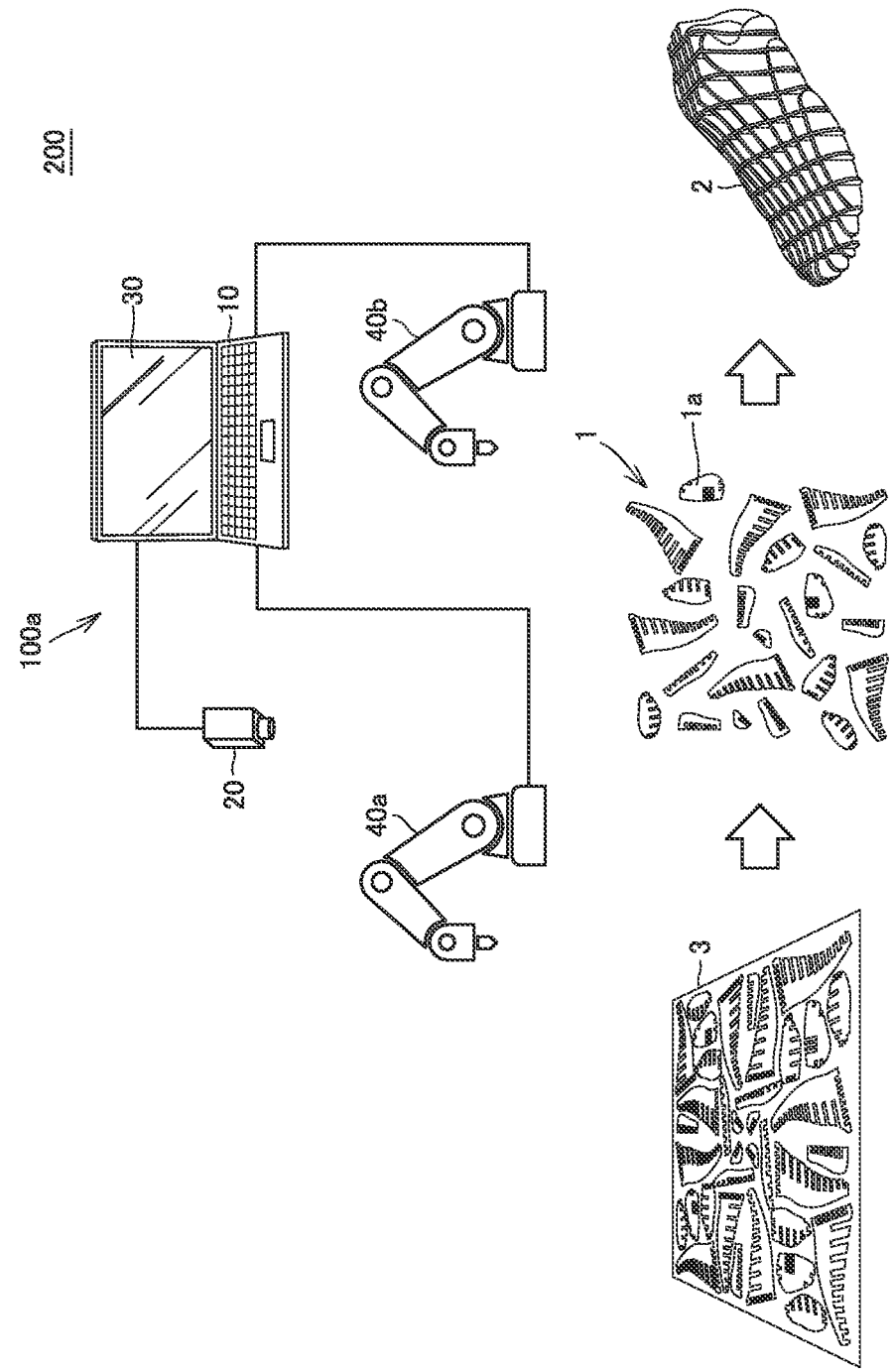
FIG. 6 is a schematic diagram showing a configuration example of a last production system according to a second embodiment.

FIG. 6 is a schematic diagram showing a configuration example of a last production system 200 according to the second embodiment. The last production system 200 comprises a last production assisting apparatus 100*a*, and robot arms 40*a* and 40*b* for the production apparatus. As well as the last production assisting apparatus 100 according to the first embodiment, the last production assisting apparatus 100*a* comprises the control unit 10, the camera 20, and the display 30. In the last production assisting apparatus 100*a*, the control unit 10 and the display 30 are shown integrated together in a hardware configuration, as shown in FIG. 2. As a matter of course, the last production assisting apparatus 100*a* may have the control unit 10 and the display 30 in separate hardware configurations.

The control unit 10 is connected to the robot arms 40*a* and 40*b* via a communication controller 120 (a communication unit) and thus controls the robot arms 40*a* and 40*b* to carry and assemble parts. The control unit 10 may control the robot arms 40*a* and 40*b* via a programmable logic controller (PLC) or the like, rather than directly controlling the robot arms 40*a* and 40*b*.

In the last production system 200, initially, a plurality of plate-shaped parts cut out of cardboard 3 by a laser processing machine are transported by the robot arm 40*a* to an assembling space such as a work table. While the robot arm 40*a* is a multi-articulated (or multiaxial) robot arm, it may be a horizontally multi-articulated robot arm if the robot arm transports a plurality of plate-shaped parts only horizontally.

The plurality of plate-shaped parts 1 transported to the assembling space are assembled by the robot arm 40*b* to complete the last 2. Although the robot arm 40*b* is a multi-articulated (or multiaxial) robot arm, an operation of assembling the plurality of plate-shaped parts 1 involves moving the plate-shaped parts 1 horizontally and vertically, and accordingly, a horizontally and vertically multi-articulated robot arm is required.

Specifically, once the robot arm 40*b* has received from the last production assisting apparatus 100*a* information of a plate-shaped part 1*a* identified from an image captured by the camera 20, the arm has a distal end thereof moved to the plate-shaped part 1*a* and held there. Further, once the robot arm 40*b* has received from the last production assisting apparatus 100*a* information of an attachment position calculated by the control unit 10 for the plate-shaped part 1, the arm is moved to attach the plate-shaped part 1 to the attachment position. The robot arm 40*b* completes producing the last 2 by repeating this operation for all of the plurality of plate-shaped parts 1 present in the assembling space.

The last production assisting apparatus 100*a* has the display 30 so that the administrator of the system can confirm and the last production assisting apparatus 100*a* can cause the display 30 to display an attachment position assumed by the identified plate-shaped part 1*a* in the last 2 when it is completed. As a matter of course, the last production assisting apparatus 100*a* may dispense with the display 30 if it is unnecessary to confirm the attachment position for the plate-shaped part 1 through the last production assisting apparatus 100*a*.

While in the last production system 200 a plurality of parts are assembled only by the robot arms 40*a* and 40*b* of the production apparatus to complete the last 2, this is not exclusive. For example, the last production system may be a last production system in which a robot arm of a production apparatus and an operator cooperate or share work to assemble a plurality of parts to complete the last 2. In this case, the last production assisting apparatus included in the last production system not only includes the communication controller 120 (or a communication unit) for transmitting information of attachment positions for the plurality of parts to the robot arm of the production apparatus, but also has at least one of a display, a speaker, a tactile device, an AR goggle, a VR goggle, an MR goggle, and the like in order to transmit the information of the attachment positions for the plurality of parts to the operator.

Thus, the last production system 200 according to the second embodiment is a production system that produces a last by assembling a plurality of parts. The last production system 200 comprises the camera 20, the storage 110, the processor 102, the robot arm 40*b* (or a production apparatus), and the communication controller 120 (or a communication unit). The camera 20 images a plurality of parts constituting a last. The storage 110 stores production information for producing the last. Based on the production information, the processor 102 calculates attachment positions or the like for the plurality of parts imaged by the camera 20. The robot arm 40*b* assembles the plurality of parts. The communication controller 120 transmits to the robot arm 40*b* the attachment positions calculated by the processor 102 for the plurality of parts.

Thus, when the last production system 200 according to the first embodiment assembles a plurality of parts to produce a last, the last production system 200 can appropriately assist from the last production assisting apparatus 100*a* information required for producing the last and the robot arm 40*b* can efficiently produce the last.

Further, the last production assisting apparatus 100*a* may include, in place of or in addition to the display 30, the communication controller 120 that transmits to the robot arm 40*b* attachment positions calculated by the processor 102 for a plurality of parts. Thus, the last production assisting apparatus 100*a* can appropriately assist for the robot arm 40*b* information required for producing the last. By using the last production assisting apparatus 100*a*, the robot arm 40*b* can produce a last with high accuracy in a short period of time while reducing production errors.

Third Embodiment

When the last production assisting apparatus 100 according to the first embodiment is used for an operator who produces a last by assembling a plurality of plate-shaped parts, information, such as positions assumed by the plate-shaped parts when they are assembled, is provided to the operator to assist producing the last. However, when a plurality of parts are assembled to produce a last, the parts to be assembled are not limited to plate-shaped parts. In a third embodiment, an example of a last production assisting apparatus that assists producing a last when an operator produces the last by assembling a plurality of three-dimensional parts will be described.

Figure 7:
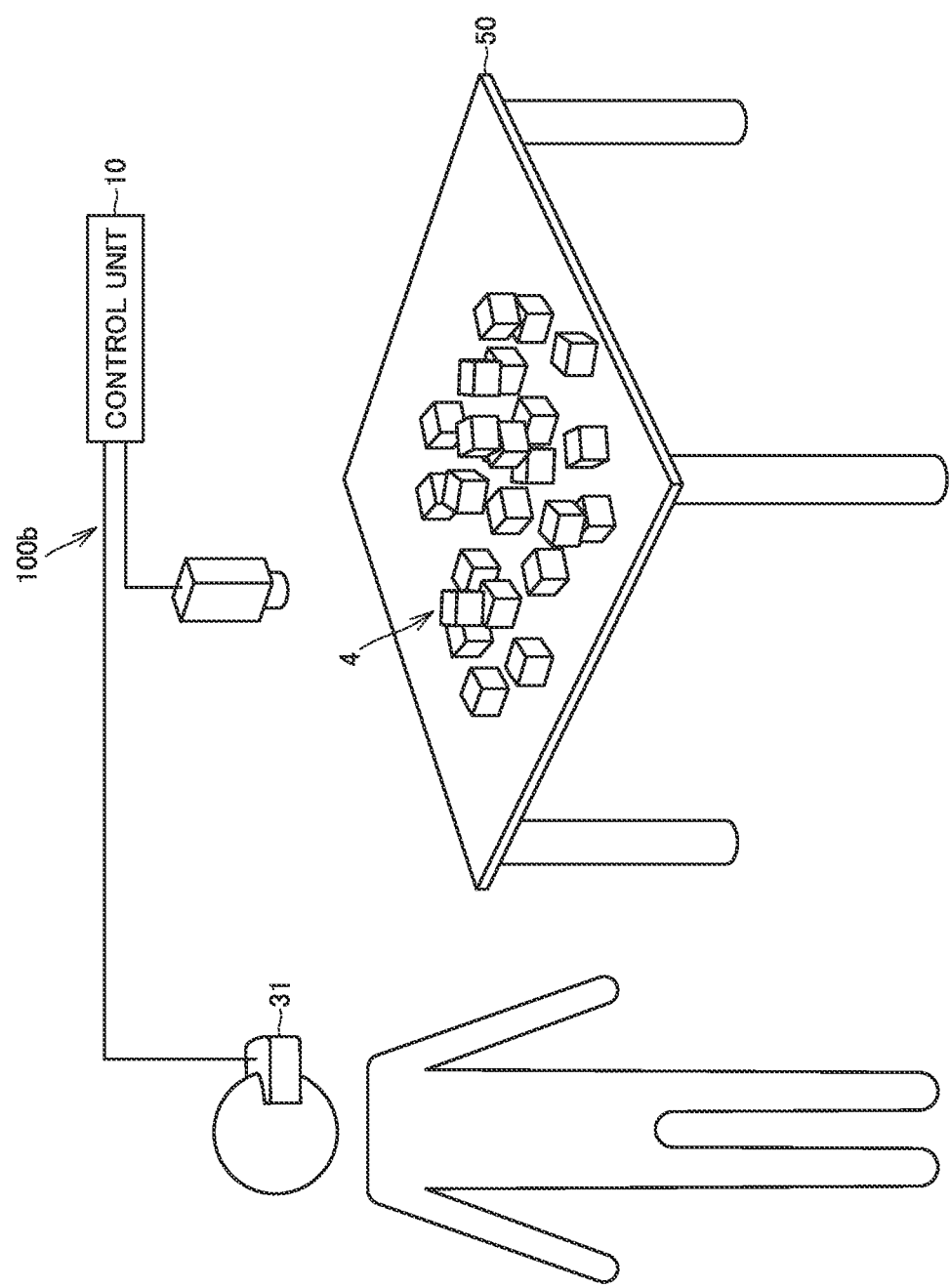
FIG. 7 is a schematic diagram showing a configuration example of a last production assisting apparatus according to a third embodiment.

FIG. 7 is a schematic diagram showing a configuration example of a last production assisting apparatus 100*b* according to the third embodiment. Referring to FIG. 7, the last production assisting apparatus 100*b* comprises the control unit 10, the camera 20 (or an imaging unit), and an AR goggle 31 (or a display unit). Any configuration of the last production assisting apparatus 100*b* that is identical to that of the last production assisting apparatus 100 shown in FIG. 1 is identically denoted and will not be specifically described repeatedly. The last production assisting apparatus 100*b* is provided on the work table 50 on which a last is produced. A plurality of voxels 4, which are three-dimensional parts that can be assembled to produce a last, are placed on the work table 50. In the third embodiment, the plurality of voxels 4 each has an engaging portion used to couple a voxel 4 to produce a last. The three-dimensional part is not limited to the voxel 4 in the form of a box, and it may be a spherical bead, a cylindrical bead, or the like, and the structure to be engaged is not limited.

Figure 8:
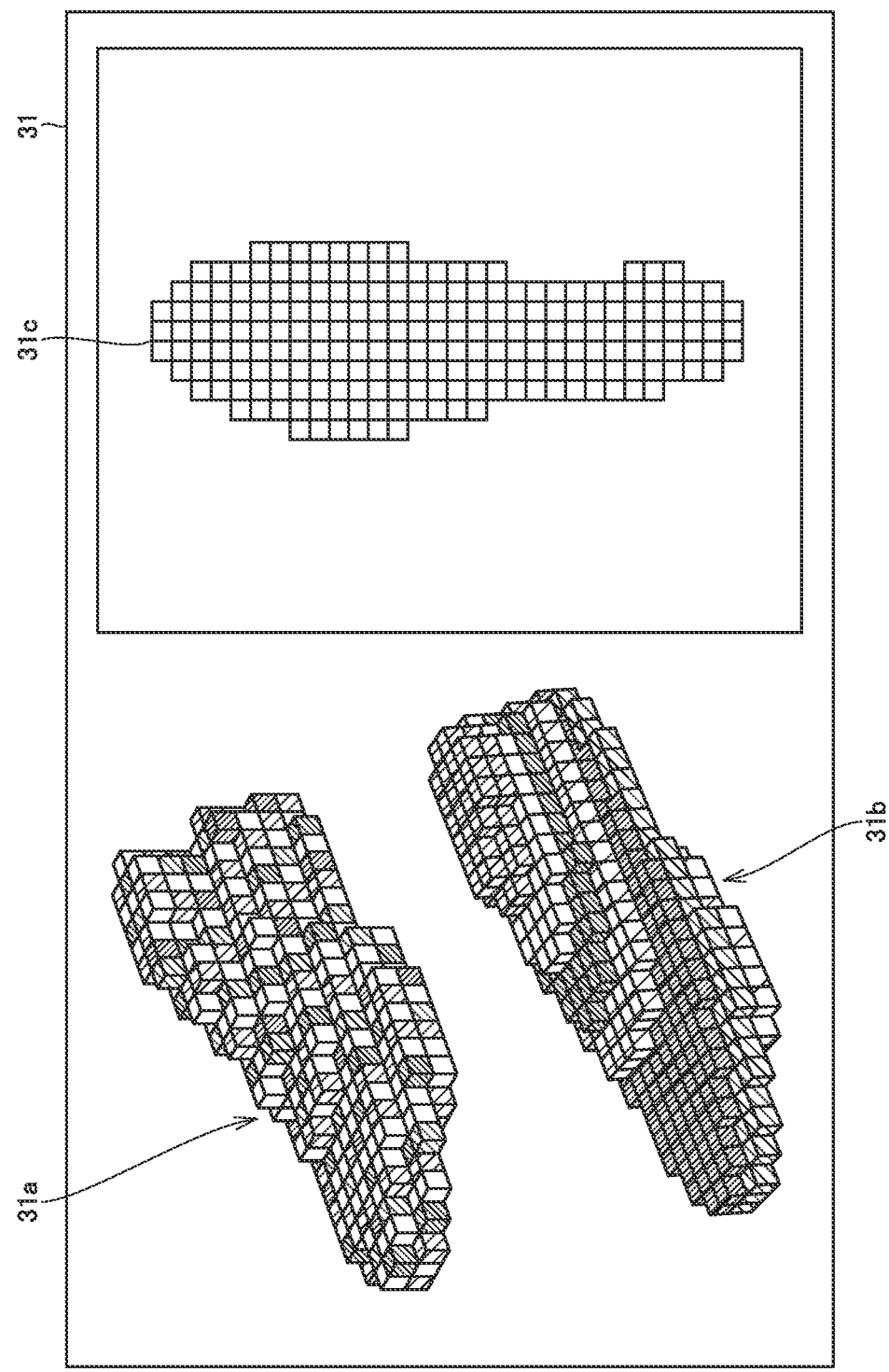
FIG. 8 is a diagram showing an example of indication displayed by a display unit of the last production assisting apparatus according to the third embodiment.

The last production assisting apparatus 100*b* causes the AR goggle 31 to display assistive information for producing a last from the plurality of voxels 4 as recognized by the camera 20. The AR goggle 31 displays information such as attachment positions for the plurality of voxels 4 as assistive information for producing a last from the plurality of voxels 4. Specifically, as the information such as the attachment positions for the voxels 4, information such as the number of voxels 4 disposed in the same voxel layer, the arrangement of the voxels 4, and the like is displayed by the AR goggle 31 as augmented reality. FIG. 8 is a diagram showing an example of indication displayed by the display unit of the last production assisting apparatus 100*b* according to the third embodiment. As shown in FIG. 8, for example, the AR goggle 31 displays an image 31*a* of a last assembled from a plurality of voxels 4, an image 31*b* of the last shown such that the voxels 4 disposed in the same voxel layer are color-coded so that it is understood how many voxel layers configure the last, and an image 31*c* showing a contour formed by a plurality of voxels 4 disposed in one voxel layer configuring the last.

Figure 9A:
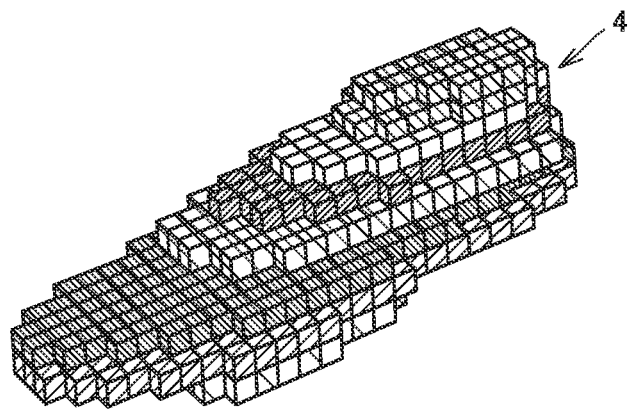
FIG. 9A is a diagram for illustrating information for assistance for an attachment position for a voxel.
Figure 9B:
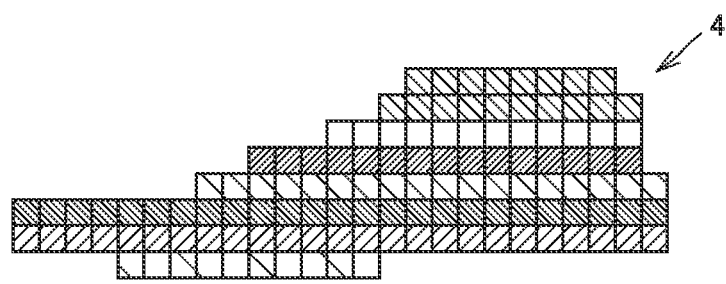
FIG. 9B is a diagram for illustrating information for assistance for an attachment position for a voxel.
Figure 9C:
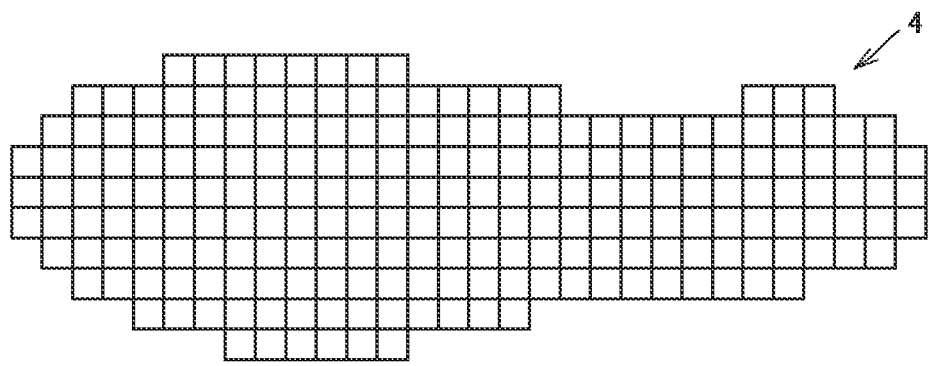
FIG. 9C is a diagram for illustrating information for assistance for an attachment position for a voxel.

In the last production assisting apparatus 100*b*, when a plurality of voxels 4 are disposed in layers sequentially from a lowest layer, a contour formed by a plurality of voxels 4 disposed in a voxel layer being worked on is displayed in the image 31*c*. A color of the plurality of voxels 4 displayed in the image 31*c* is caused to correspond to that of a respective voxel layer color-coded in the image 31*b*. Further, assistive information displayed on the AR goggle 31 for producing a last will be described with reference to drawings. FIGS. 9A to 9C are schematic diagrams for illustrating information for assistance for an attachment position for a voxel 4. FIG. 9A, as well as the image 31*b* in FIG. 8, shows an example of causing the AR goggle 31 to display a perspective view of a last in which each voxel layer has its voxels 4 color-coded. FIG. 9B shows an example of causing the AR goggle 31 to display a side view to help understanding a layer structure of the last in a heightwise direction thereof. FIG. 9C, as well as the image 31*b*, shows an example of causing the AR goggle 31 to display a contour formed by a plurality of voxels 4 disposed in one voxel layer.

The last production assisting apparatus 100*b* allows the FIGS. 9A to 9C screens to be displayed to help the operator to understand which position in the last a voxel layer being worked on assumes and how a plurality of voxels 4 should be disposed. The AR goggle 31 may display a position for a voxel 4 to be next disposed as augmented reality. The AR goggle 31 is one example, and the display unit may be a VR goggle, an MR goggle, a display, or the like. That is, a display unit that can display assistive information in any manner visibly to the operator, suffices. While the display has been described by way of example as a screen such as a monitor used to provide an operator with assistive information such as an attachment position for a voxel 4, a screen such as a monitor may not be used and a device may be used to provide the assistive information to the operator. For example, it may be a device which provides the assistive information by exposing an identified voxel 4 to a laser beam or the like, or may be a device which provides the assistive information by directly projecting information on the work table 50 or in a working space. Further, the last production assisting apparatus 100*b* may comprise at least one of a speaker, a tactile device, and the like instead of the AR goggle 31 or additionally, and output an attachment position for a voxel 4 from these devices.

Thus, in the last production assisting apparatus 100*b* according to the third embodiment, when a plurality of parts are voxels 4, the processor 102 causes the AR goggle 31 to display a contour formed by a plurality of voxels 4 disposed and a color-coded plurality of voxels 4 disposed in the same layer.

Thus, the last production assisting apparatus 100*b* according to the third embodiment can appropriately assist information required for producing a last when a plurality of voxels 4 are assembled to produce the last. An operator using the last production assisting apparatus 100*b* can produce a last with high accuracy in a short period of time while reducing production errors.

Fourth Embodiment

When the last production assisting apparatus 100 according to the first embodiment is used for an operator who produces a last by assembling a plurality of plate-shaped parts, information, such as positions assumed by the plate-shaped parts when they are assembled, is provided to the operator to assist producing the last. However, a method for producing a last is not limited to forming a last by assembling a plurality of parts. In a fourth embodiment, an example of a last production assisting apparatus that assists producing a last when an operator produces the last by processing an object which is a standard last will be described.

Figure 10:
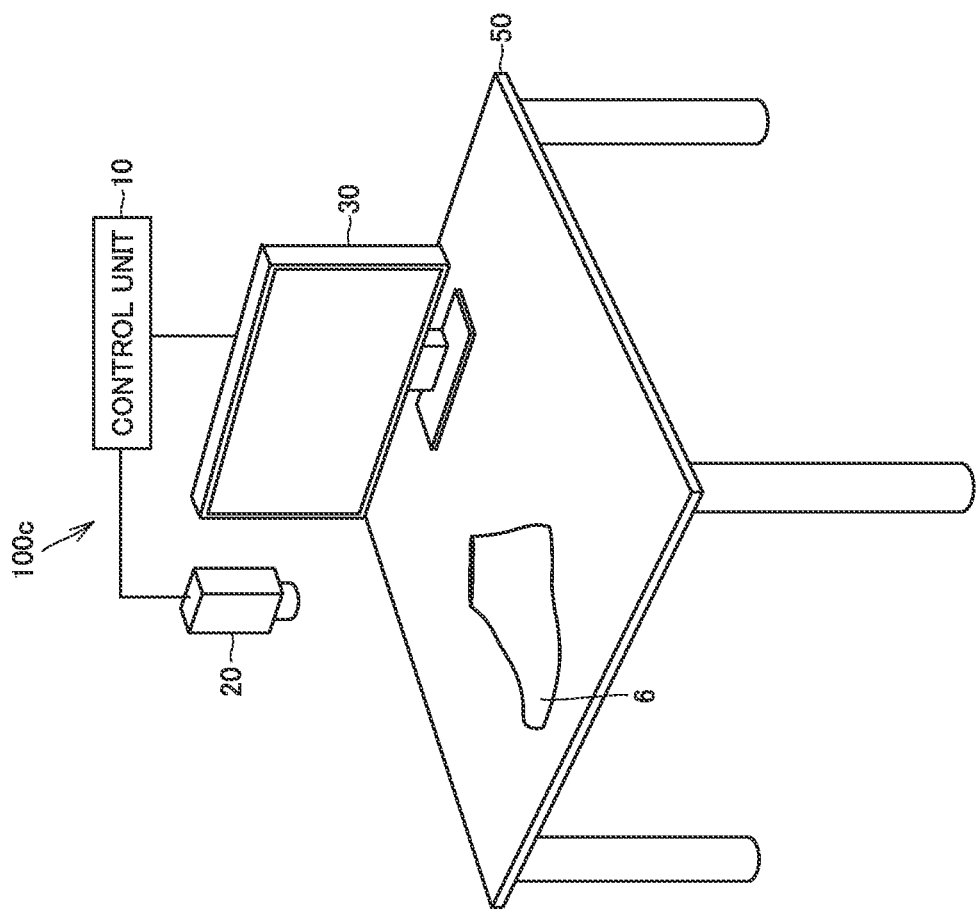
FIG. 10 is a schematic diagram showing a configuration example of a last production assisting apparatus according to a fourth embodiment.

FIG. 10 is a schematic diagram showing a configuration example of a last production assisting apparatus 100*c* according to the fourth embodiment. Referring to FIG. 10, the last production assisting apparatus 100*c* comprises the control unit 10, the camera 20 (an imaging unit), and the display 30 (a display unit). Any configuration of the last production assisting apparatus 100c that is identical to that of the last production assisting apparatus 100 shown in FIG. 1 is identically denoted and will not be specifically described repeatedly. The last production assisting apparatus 100c is provided on the work table 50 on which a last is produced. An object 6, which is a standard last, is placed on the work table 50. The object 6 is, for example, a standard last having a shoe size for users, and is made of thermoplastic resin, wood, metal, or the like.

Figure 11:
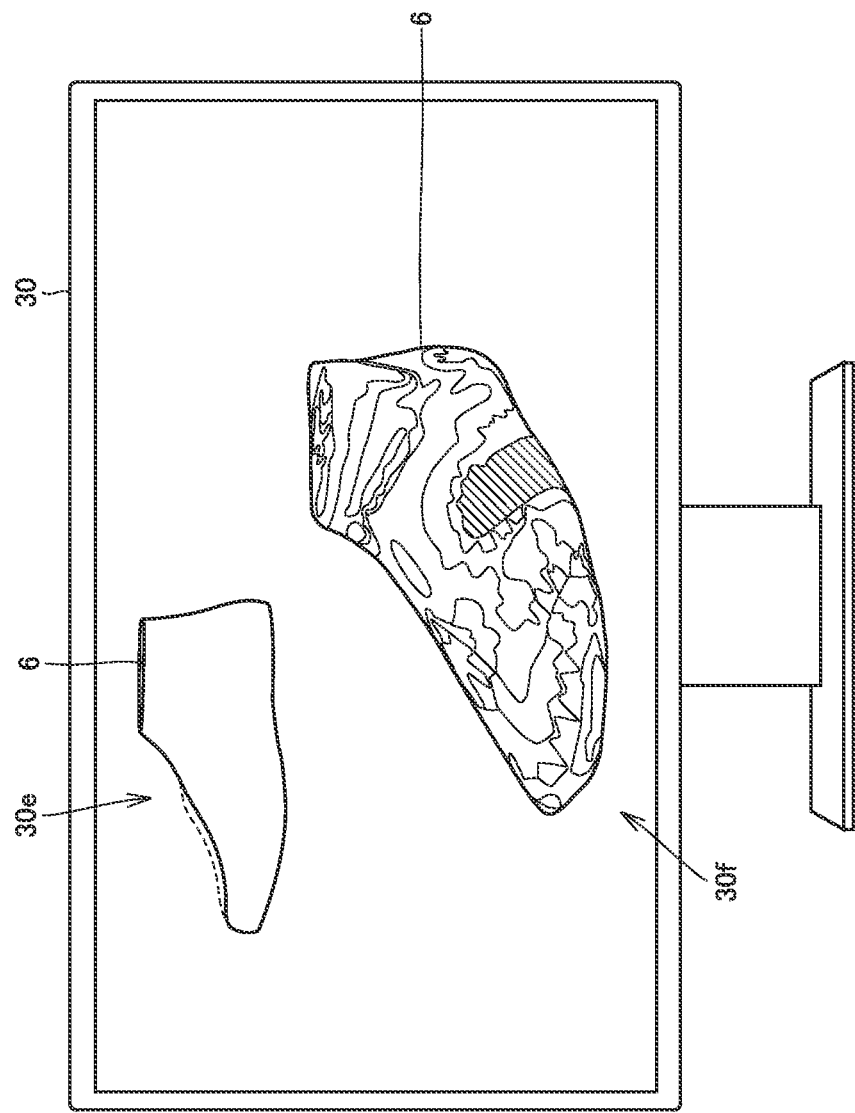
FIG. 11 is a diagram showing an example of indication displayed by a display unit of the last production assisting apparatus according to the fourth embodiment.

The display 30 displays information, such as a region of the object 6 to be processed, an amount in which the object 6 is processed, and the like as assistive information for producing a last suitable for a foot of a user by processing the object. FIG. 11 is a diagram showing an example of indication displayed by the display unit of the last production assisting apparatus 100c according to the fourth embodiment. The display 30 displays, for example, as shown in FIG. 11, a screen 30e showing a difference in shape between a completed last and the object, and a screen 30f showing a region of the object that needs to be reshaped with respect to the shape of the completed last. In the last production assisting apparatus 100c, for example, the screen 30e shows the shape of the object 6 by a broken line to indicate an amount to be processed so that the object 6 is close to the shape of the completed last, and the screen 30f shows a region of the object 6 that needs to be reshaped by a contour line. In the screen 30f, a region that needs to be reshaped may be color-coded depending on an amount to be reshaped, and thus displayed.

In the last production assisting apparatus 100c, the control unit 10 processes assistive information for producing a last by processing the object 6 recognized by the camera 20. The control unit 10 (or the processor 102) compares the shape of the object 6 recognized by the camera 20 with the shape of a completed last stored in the last database 1108, and, from a difference between the shape of the completed last and the shape of the object 6, calculates a region of the object 6 to be processed and an amount in which the object 6 is processed. The display 30 displays the region of the object 6 to be processed and the amount in which the object 6 is processed that are calculated by the processor 102. Further, in the last production assisting apparatus 100c, the object 6 in process is recognized by the camera 20, and a region to be processed of the object 6 in process and an amount in which the object 6 in process is processed are calculated based on a difference between the shape of the completed last and the shape of the object 6 in process. The display 30 updates information of the region to be processed of the displayed object 6 and the amount in which the displayed object 6 is processed to information of the region to be processed of the object 6 in process and the amount in which the object 6 in process is processed, and displays the updated information.

The operator can complete the last without trial and error by looking at information of the region of the object 6 to be processed and the amount in which the object 6 is processed that is displayed on the display 30 while processing the object 6. The object 6 can be processed not only by shaving the object 6 but also in a known processing method such as using putty to provide a larger shape or the like. For example, an object 6 made of a thermoplastic material is partially or entirely increased in temperature and thus softened to be reshaped into a completed last. Further, for example, thermal expansion of a material of the object 6 is utilized to change the object 6 partially or entirely in volume to reshape the object 6 into a completed last.

Further, the last production assisting apparatus 100c is also not limited to the display 30 as a device that outputs a region of the object 6 to be processed and an amount in which the object 6 is processed. The last production assisting apparatus 100c may comprise at least one of a speaker, a tactile device, an AR goggle, a VR goggle, and the like in place of or in addition to the display 30, and output from these devices a region of the object 6 to be processed and an amount in which the object 6 is processed. That is, a device such as the display 30 and a tactile device may be any device that can output the assistive information in any manner recognizably by the operator. While the display 30 has been described by way of example as a screen such as a monitor used to provide an operator with assistive information such as a region of the object 6 to be processed, an amount in which the object 6 is processed, and the like, a screen such as a monitor may not be used and a device may be used to provide the assistive information to the operator. For example, it may be a device which provides the assistive information by exposing a region of the object 6 to be processed to a laser beam or the like, or may be a device which provides the assistive information by directly projecting information on the work table 50 or in a working space. Further, the last production system described in the second embodiment can be implemented by connecting to a production apparatus such as a cutting machine via the communication controller 120 (or a communication unit) of the last production assisting apparatus 100c.

Thus, the last production assisting apparatus 100c according to the fourth embodiment is a production assisting apparatus for use when an object is processed to produce a last. The last production assisting apparatus 100c comprises the camera 20, the storage 110, the processor 102, and the display 30. The camera 20 images the object 6. The storage 110 stores production information for producing the last. Based on the production information, the processor 102 calculates a region to be processed of the object 6 imaged by the camera 20, an amount in which the object 6 imaged by the camera 20 is processed, and the like. The display 30 displays the region of the object 6 to be processed, the amount in which the object 6 is processed and the like that are calculated by the processor 102.

Thus, when an object is processed to produce a last, the last production assisting apparatus 100c according to the fourth embodiment can assist, as appropriate, information required for producing the last. An operator using the last production assisting apparatus 100c can produce a last with high accuracy in a short period of time while reducing production errors.

Further, when the object 6 is processed to produce a last, the processor 102 calculates a region of the object 6 to be processed and an amount in which the object 6 is processed based on a difference between the shape of a completed last and the shape of the object. Thus the last production assisting apparatus 100c can calculate the region of the object 6 to be processed and the amount in which the object 6 is processed as the information required for producing the last, and can thus assist producing the last, as appropriate.

A speaker which audibly outputs a region of the object 6 to be processed, an amount in which the object 6 is processed and the like that are calculated by the processor 102 may be provided in place of or in addition to the display 30. Thus, the last production assisting apparatus 100c can appropriately, audibly assist information required for producing a last.

A tactile device which outputs as tactile information a region of the object 6 to be processed, an amount in which the object 6 is processed and the like that are calculated by the processor 102 may be provided in place of or in addition to the display 30. Thus, the last production assisting apparatus 100c can use the tactile information to appropriately assist information required for producing a last.

An AR goggle, a VR goggle, or the like may be used for the display unit to display information such as a region of the object 6 to be processed, an amount in which the object 6 is processed and the like that are calculated by the processor 102 as information of at least one of virtual reality and augmented reality. Thus, the last production assisting apparatus 100c can use information of at least one of virtual reality and augmented reality to appropriately assist information required for producing a last.

Fifth Embodiment

When the last production assisting apparatus 100 according to the first embodiment is used for an operator who produces a last by assembling a plurality of plate-shaped parts, information, such as positions assumed by the plate-shaped parts when they are assembled, is provided to the operator to assist producing the last. However, a method for producing a last is not limited to forming a last by assembling a plurality of parts. In a fifth embodiment, an example of a last production assisting apparatus that assists producing a last when an operator produces the last by adjusting a plurality of parts will be described.

FIG. 12 is a schematic diagram showing a configuration example of a last production assisting apparatus 100d according to the fifth embodiment. Referring to FIG. 12, the last production assisting apparatus 100d comprises the control unit 10, the camera 20 (an imaging unit), and the display 30 (a display unit). Any configuration of the last production assisting apparatus 100d that is identical to that of the last production assisting apparatus 100 shown in FIG. 1 is identically denoted and will not be specifically described repeatedly. The last production assisting apparatus 100d is provided on the work table 50 on which a last is produced. A last 8 having a plurality of adjustable parts is placed on the work table 50.

The last 8 includes a common portion that is invariable in shape and position at a portion corresponding to toes and that corresponding to a portion extending to a heel from a middle foot portion extending from an ankle to an arch. Further, the last 8 includes as a movable portion invariable in shape and positionally adjustable a movable portion 80a at a portion of the middle foot portion corresponding to the first toe and the fifth toe and a movable portion 80b at a portion of the middle foot portion on the side of the instep. The movable portion 80a is positionally movable widthwise. The movable portion 80b is positionally movable in level and angularly changeable with respect to the common portion. That is, the movable portions 80a and 80b are a plurality of adjustable parts.

The last 8 couples a pair of right and left movable portions 80a by a position adjusting mechanism. The position adjusting mechanism changes the movable portion 80a positionally with respect to the common portion. Alternatively, the position adjusting mechanism can fix the movable portion 80a to a predetermined position after the movable portion 80a is positionally changed. The last 8 couples the movable portion 80b to the common portion by a position adjusting mechanism. The position adjusting mechanism changes the movable portion 80b positionally with respect to the common portion. Alternatively, the position adjusting mechanism can fix the movable portion 80b to a predetermined position after the movable portion 80b is positionally changed. In the last 8 having a plurality of adjustable parts, the movable portions 80a and 80b and the position adjusting mechanism are an example, and for example, a last may have liquid or an air bag provided therein and adjusted in pressure, volume or the like to partially or entirely reshape the last.

The display 30 displays information such as an amount in which the movable portions 80a and 80b are adjusted as assistive information for producing a last matching a foot of a user by adjusting the movable portions 80a and 80b. FIG. 13 is a diagram showing an example of indication displayed by the display unit of the last production assisting apparatus 100d according to the fifth embodiment. For example, as shown in FIG. 13, display 30 displays a screen 30g showing the movable portions 80a and 80b in need of adjustment and a screen 30h indicating an amount in which the movable portions 80a and 80b in need of adjustment are adjusted. In the last production assisting apparatus 100d, for example, the screen 30g indicates the movable portions 80a and 80b in need of adjustment by blinking, changing a color, animation, or the like, and the screen 30h indicates an amount in which the movable portions 80a and 80b in need of adjustment are adjusted. For example, the screen 30h displays that an amount in which the movable portion 80a is adjusted is positionally set to Xa, Ya and Za angularly set to θa.

In the last production assisting apparatus 100d, the control unit 10 processes assistive information for producing a last by adjusting the movable portions 80a and 80b of the last 8 recognized by the camera 20. The control unit 10 (or the processor 102) compares the shape of the last 8 recognized by the camera 20 with the shape of a completed last stored in the last database 1108, and, from a difference between the shape of the completed last and the shape of the last 8, calculates an amount in which the last 8 has the movable portions 80a and 80b adjusted. The display 30 displays the amount in which the last 8 has the movable portions 80a and 80b adjusted that is calculated by the processor 102. Further, in the last production assisting apparatus 100d, the camera 20 recognizes the last 8 being adjusted, and an amount in which the last 8 being adjusted has the movable portions 80a and 80b adjusted is calculated based on a difference between the shape of a completed last and the shape of the last 8 being adjusted. The display 30 updates information of the amount in which the displayed last 8 has the movable portions 80a and 80b adjusted to information of the amount in which the last 8 being adjusted has the movable portions 80a and 80b adjusted, and the display 30 displays the updated information.

The operator can complete the last without trial and error by adjusting the movable portions 80a and 80b of the last 8 while looking at information of an amount in which the movable portions 80a and 80b are adjusted that is displayed on the display 30. The last 8 may be provided with an adjustable part other than the movable portions 80a and 80b. Furthermore, the last production system described in the second embodiment can be implemented by connecting to a production apparatus such as a robot arm via the communication controller 120 (or a communication unit) of the last production assisting apparatus 100d.

Further, the last production assisting apparatus 100d is also not limited to the display 30 as a device that outputs an amount in which the last 8 has the movable portions 80a and 80b adjusted. The last production assisting apparatus 100d may comprise at least one of a speaker, a tactile device, an AR goggle, a VR goggle, and the like in place of or in addition to the display 30, and output from these devices an amount in which the last 8 has the movable portions 80*a* and 80*b* adjusted. That is, a device such as the display 30 and a tactile device may be any device that can output the assistive information in any manner recognizably by the operator. While the display 30 has been described by way of example as a screen such as a monitor used to provide an operator with assistive information such as an amount in which the movable portions 80*a* and 80*b* are adjusted, a screen such as a monitor may not be used and a device may be used to provide the assistive information to the operator. For example, it may be a device which provides the assistive information by exposing the movable portions 80*a* to be adjusted to a laser beam or the like, or may be a device which provides the assistive information by directly projecting information on the work table 50 or in a working space.

As described above, the last production assisting apparatus 100*d* according to the fifth embodiment is a production assisting apparatus for use when a plurality of parts (the movable portions 80*a* and 80*b* of the last 8) are adjusted to produce a last. The last production assisting apparatus 100*d* comprises the camera 20, the storage 110, the processor 102, and the display 30. The camera 20 images the movable portions 80*a* and 80*b* of the last 8. The storage 110 stores production information for producing the last. Based on the production information, the processor 102 calculates an amount in which the last 8 has adjusted the movable portions 80*a* and 80*b* imaged by the camera 20, and the like. The display 30 displays the amount in which the last 8 has the movable portions 80*a* and 80*b* adjusted and the like that is calculated by the processor 102.

Thus, the last production assisting apparatus 100*d* according to the fifth embodiment can appropriately assist information required for producing a last when a plurality of parts are adjusted to produce the last. An operator using the last production assisting apparatus 100*d* can produce a last with high accuracy in a short period of time while reducing production errors.

When a plurality of parts are adjusted to produce a last, the processor 102 calculates an amount in which the last 8 has the movable portions 80*a* and 80*b* adjusted based on a difference between the shape of a completed last and the shape of the last 8 having a part to be adjusted. Thus the last production assisting apparatus 100*d* can calculate an amount in which the last 8 has the movable portions 80*a* and 80*b* adjusted as information required for producing the last, and thus assist producing the last, as appropriate.

A speaker which audibly outputs an amount in which the last 8 has the movable portions 80*a* and 80*b* adjusted and the like that is calculated by the processor 102 may be provided in place of or in addition to the display 30. Thus, the last production assisting apparatus 100*d* can appropriately, audibly assist information required for producing a last.

A tactile device which outputs as tactile information an amount in which the last 8 has the movable portions 80*a* and 80*b* adjusted and the like that is calculated by the processor 102 may be provided in place of or in addition to the display 30. Thus, the last production assisting apparatus 100*d* can use the tactile information to appropriately assist information required for producing a last.

An AR goggle, a VR goggle, or the like may be used for the display unit to display information such as an amount in which the last 8 has the movable portions 80*a* and 80*b* adjusted and the like that is calculated by the processor 102 as information of at least one of virtual reality and augmented reality. Thus, the last production assisting apparatus 100*d* can use information of at least one of virtual reality and augmented reality to appropriately assist information required for producing a last.

<Other Variations>

The data of the storage 110 may be stored in a data server of a store, a data server disposed at a manufacturer different from the store, or a data server located at another location. The data server may also be implemented in the form of a cloud service.

The above described method for producing a last is an example, and it is not exclusive. For example, it may be a method for producing a last for a hybrid type in which a portion corresponding to toes is composed of a plurality of plate-shaped parts and a portion extending from the middle foot portion to the heel is composed of a solid part such as thermoplastic resin.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A last production assisting apparatus that is used when producing a last by assembling or adjusting a plurality of parts constituting the last or processing an object, the apparatus comprising:
 a camera configured to image the plurality of parts constituting the last, or the object;
 a storage configured to store production information for producing the last;
 a processor configured to calculate based on the production information positions at which the plurality of parts imaged by the camera are attached or an amount in which the plurality of parts imaged by the camera are adjusted, or a region of the object to be processed and an amount in which the object is processed; and
 a display configured to display the positions at which the plurality of parts are attached or the amount in which the plurality of parts are adjusted, or the region of the object to be processed and the amount in which the object is processed, as calculated by the processor;
 wherein the last is separate from a shoe to the formed on the last; and
 wherein the object is a portion of the last.

2. The last production assisting apparatus according to claim 1, further comprising:
 a speaker configured to audibly output the positions at which the plurality of parts are attached or the amount in which the plurality of parts are adjusted, or the region of the object to be processed and the amount in which the object is processed, as calculated by the processor.

3. The last production assisting apparatus according to claim 1, further comprising:
 a tactile device configured to output, as tactile information, the positions at which the plurality of parts are attached or the amount in which the plurality of parts are adjusted, or the region of the object to be processed and the amount in which the object is processed, as calculated by the processor.

4. The last production assisting apparatus according to claim 2, further comprising:
 a tactile device configured to output, as tactile information, the positions at which the plurality of parts are attached or the amount in which the plurality of parts are adjusted, or the region of the object to be processed and the amount in which the object is processed, as calculated by the processor.

5. The last production assisting apparatus according to claim 1, further comprising:
a communication controller configured to transmit to a production apparatus the positions at which the plurality of parts are attached or the amount in which the plurality of parts are adjusted, or the region of the object to be processed and the amount in which the object is processed, as calculated by the processor.

6. The last production assisting apparatus according to claim 2, further comprising:
a communication controller configured to transmit to a production apparatus the positions at which the plurality of parts are attached or the amount in which the plurality of parts are adjusted, or the region of the object to be processed and the amount in which the object is processed, as calculated by the processor.

7. The last production assisting apparatus according to claim 3, further comprising:
a communication controller configured to transmit to a production apparatus the positions at which the plurality of parts are attached or the amount in which the plurality of parts are adjusted, or the region of the object to be processed and the amount in which the object is processed, as calculated by the processor.

8. The last production assisting apparatus according to claim 1, wherein
the display is configured to display information of the positions at which the plurality of parts are attached or the amount in which the plurality of parts are adjusted, or the region of the object to be processed and the amount in which the object is processed, as calculated by the processor, as information of at least one of virtual reality and augmented reality.

9. The last production assisting apparatus according to claim 2, wherein
the display is configured to display information of the positions at which the plurality of parts are attached or the amount in which the plurality of parts are adjusted, or the region of the object to be processed and the amount in which the object is processed, as calculated by the processor, as information of at least one of virtual reality and augmented reality.

10. The last production assisting apparatus according to claim 3, wherein
the display is configured to display information of the positions at which the plurality of parts are attached or the amount in which the plurality of parts are adjusted, or the region of the object to be processed and the amount in which the object is processed, as calculated by the processor, as information of at least one of virtual reality and augmented reality.

11. The last production assisting apparatus according to claim 4, wherein
the display is configured to display information of the positions at which the plurality of parts are attached or the amount in which the plurality of parts are adjusted, or the region of the object to be processed and the amount in which the object is processed, as calculated by the processor, as information of at least one of virtual reality and augmented reality.

12. The last production assisting apparatus according to claim 1, wherein
the display is configured to display, on a single screen, the positions at which the plurality of parts are attached or the amount in which the plurality of parts are adjusted, or the region of the object to be processed and the amount in which the object is processed, and the last in a completed shape.

13. The last production assisting apparatus according to claim 2, wherein
the display is configured to display, on a single screen, the positions at which the plurality of parts are attached or the amount in which the plurality of parts are adjusted, or the region of the object to be processed and the amount in which the object is processed, and the last in a completed shape.

14. The last production assisting apparatus according to claim 3, wherein
the display is configured to display, on a single screen, the positions at which the plurality of parts are attached or the amount in which the plurality of parts are adjusted, or the region of the object to be processed and the amount in which the object is processed, and the last in a completed shape.

15. The last production assisting apparatus according to claim 1, wherein
when the plurality of parts are assembled to produce the last, the processor is configured to sequentially identify from imaged ones of the plurality of parts a part to be attached to the last in accordance with an assembling procedure, calculates an attachment position for the identified part, and causes the display to display the calculated attachment position.

16. The last production assisting apparatus according to claim 1, wherein
when the plurality of parts are assembled to produce the last, the processor is configured to identify a part held by an operator in a captured image, calculates an attachment position for the identified part, and causes the display to display the calculated attachment position.

17. The last production assisting apparatus according to claim 1, wherein
when the plurality of parts are voxels, the processor is configured to cause the display to display a contour formed by a plurality of the voxels disposed, and a plurality of the voxels color-coded as they are disposed in a single layer.

18. The last production assisting apparatus according to claim 1, wherein
when the plurality of parts are adjusted to produce the last, the processor is configured to calculate, based on a difference between a shape of the last when it is completed and a shape of the last when it has a part to be adjusted, an amount in which that part is adjusted.

19. The last production assisting apparatus according to claim 1, wherein
when the object is processed to produce the last, the processor is configured to calculate a region of the object to be processed and an amount in which the object is processed, based on a difference between a shape of the last when completed and a shape of the object.

20. A last production system that produces a last by assembling or adjusting a plurality of parts constituting the last or processing an object, the system comprising:
a camera configured to image the plurality of parts constituting the last, or the object;
a storage configured to store production information for producing the last;
a processor configured to calculate based on the production information positions at which the plurality of parts imaged by the camera are attached or an amount in which the plurality of parts imaged by the camera are adjusted, or a region of the object to be processed and an amount in which the object is processed;

a production apparatus configured to assemble or adjust the plurality of parts or processes the object; and a communication controller configured to transmit to the production apparatus the positions at which the plurality of parts are attached or the amount in which the plurality of parts are adjusted, or the region of the object to be processed and the amount in which the object is processed, as calculated by the processor;

wherein the last is separate from a shoe to the formed on the last; and wherein the object is a portion of the last.

* * * * *